US008428011B2

(12) United States Patent  
Inoue et al.

(10) Patent No.: US 8,428,011 B2
(45) Date of Patent: Apr. 23, 2013

(54) RESOURCE ALLOCATION CONTROL METHOD AND DEVICE IN MOBILE RADIO COMMUNICATIONS SYSTEM

(75) Inventors: Takamichi Inoue, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 1121 days.

(21) Appl. No.: 12/073,768

(22) Filed: Mar. 10, 2008

(65) Prior Publication Data

US 2008/0225788 A1 Sep. 18, 2008

(30) Foreign Application Priority Data

Mar. 16, 2007  (JP) .................................. 2007-068879

(51) Int. Cl.
*H04W 4/00* (2009.01)
(52) U.S. Cl.
USPC ........ 370/329; 455/450; 455/451; 455/452.1; 455/452.2; 455/454
(58) Field of Classification Search .......... 370/204–210, 370/281, 329, 330, 335, 342, 428, 404, 479, 370/480, 488; 455/522, 67.13, 69, 115.3, 455/512, 513, 13.4
See application file for complete search history.

(56) References Cited

U.S. PATENT DOCUMENTS

| | | | | |
|---|---|---|---|---|
| 6,466,803 B1 * | 10/2002 | Gardner | ...................... | 455/553.1 |
| 6,622,172 B1 * | 9/2003 | Tam | ............................. | 709/232 |
| 7,145,887 B1 * | 12/2006 | Akgun et al. | ................ | 370/321 |
| 7,408,894 B2 * | 8/2008 | Kim et al. | ...................... | 370/318 |
| 7,555,269 B2 * | 6/2009 | Tamaki et al. | ................ | 455/102 |
| 7,639,660 B2 * | 12/2009 | Kim et al. | ...................... | 370/343 |
| 7,912,490 B2 * | 3/2011 | Pietraski | ....................... | 455/522 |
| 7,953,428 B2 * | 5/2011 | Shimizu et al. | ............... | 455/510 |
| 2001/0017896 A1 * | 8/2001 | Murakami et al. | ........... | 375/260 |
| 2004/0198404 A1 * | 10/2004 | Attar et al. | .................... | 455/522 |
| 2005/0070319 A1 * | 3/2005 | Pedersen | ....................... | 455/515 |
| 2005/0074030 A1 | 4/2005 | Cho et al. | | |
| 2005/0141446 A1 | 6/2005 | Niwano | | |
| 2005/0191965 A1 | 9/2005 | Yu et al. | | |

(Continued)

FOREIGN PATENT DOCUMENTS

| | | |
|---|---|---|
| CN | 1567759 A | 1/2005 |
| JP | 2005-244991 A | 9/2005 |

(Continued)

OTHER PUBLICATIONS

B. M. Popovic, "Generalized Chirp—Like Polyphase Sequences with Optimum Correlation Properties," IEEE Transactions on Information Theory, vol. 38:4, Jul. 1992, pp. 1406-1409.

(Continued)

*Primary Examiner* — Ian N Moore
*Assistant Examiner* — Dung B Huynh
(74) *Attorney, Agent, or Firm* — Foley & Lardner LLP

(57) ABSTRACT

For radio communications between a base station and a mobile station, resource allocation within a resource block including control resources used for control signals (CQI, ACK/NACK) and reference resources used for a reference signal is performed. The base station measures the quality of a channel between the mobile station and the base station itself. Based on the measured channel quality, the base station sets a ratio between resources for the control signals CQI and ACK/NACK in the control resources, and notifies the mobile station of the set resource ratio.

17 Claims, 14 Drawing Sheets

U.S. PATENT DOCUMENTS

| | | | |
|---|---|---|---|
| 2005/0213543 A1* | 9/2005 | Shimizu et al. | 370/335 |
| 2006/0035594 A1* | 2/2006 | Murata et al. | 455/67.13 |
| 2006/0045041 A1* | 3/2006 | Yuuki | 370/321 |
| 2006/0176866 A1* | 8/2006 | Wakabayashi | 370/342 |
| 2006/0246937 A1* | 11/2006 | Lindoff | 455/522 |
| 2006/0281462 A1* | 12/2006 | Kim et al. | 455/436 |
| 2007/0171849 A1* | 7/2007 | Zhang et al. | 370/310 |
| 2007/0211667 A1* | 9/2007 | Agrawal et al. | 370/335 |
| 2007/0254598 A1* | 11/2007 | Bachl et al. | 455/73 |
| 2007/0280365 A1* | 12/2007 | Seki | 375/260 |
| 2008/0075184 A1* | 3/2008 | Muharemovic et al. | 375/260 |
| 2008/0075195 A1* | 3/2008 | Pajukoski et al. | 375/298 |
| 2008/0090528 A1* | 4/2008 | Malladi | 455/70 |
| 2008/0095106 A1* | 4/2008 | Malladi et al. | 370/329 |
| 2008/0130527 A1* | 6/2008 | Huh et al. | 370/280 |
| 2008/0186944 A1* | 8/2008 | Suzuki et al. | 370/349 |
| 2008/0214198 A1* | 9/2008 | Chen et al. | 455/450 |
| 2008/0225822 A1* | 9/2008 | Zhang et al. | 370/343 |
| 2009/0219852 A1* | 9/2009 | Youn et al. | 370/315 |
| 2010/0048236 A1 | 2/2010 | Higuchi et al. | |
| 2010/0182975 A1* | 7/2010 | Malladi et al. | 370/330 |

FOREIGN PATENT DOCUMENTS

| | | |
|---|---|---|
| JP | 2005-269003 A | 9/2005 |
| JP | 2007-28568 A | 2/2007 |
| JP | 2000-224247 A | 8/2008 |
| KR | 2005-32796 (A) | 4/2005 |
| WO | WO 01/22645 A1 | 3/2001 |
| WO | WO 03/103328 A1 | 12/2003 |
| WO | WO 2006/130742 A1 | 12/2006 |

OTHER PUBLICATIONS

3GPP TSG-RAN WG1 #47 R1-063448, Qualcomm Europe, "Structure and Link Analysis UL Control Signaling," Nov. 2006, pp. 1-10.

3GPP TSG RAN WG1 Meeting #47, CDMA-based Multiplexing Method for Multiple ACK/NACK and CQI in E-UTRA Uplink, Nov. 10, 2006, XP002492112, pp. 1-7.

3GPP RAN1 LTE Ad Hoc; Uplink ACK/NACK Signalling: FDM vs. TDM, Jun. 30, 2006, XP002492125, Samsung, pp. 1-9.

* cited by examiner

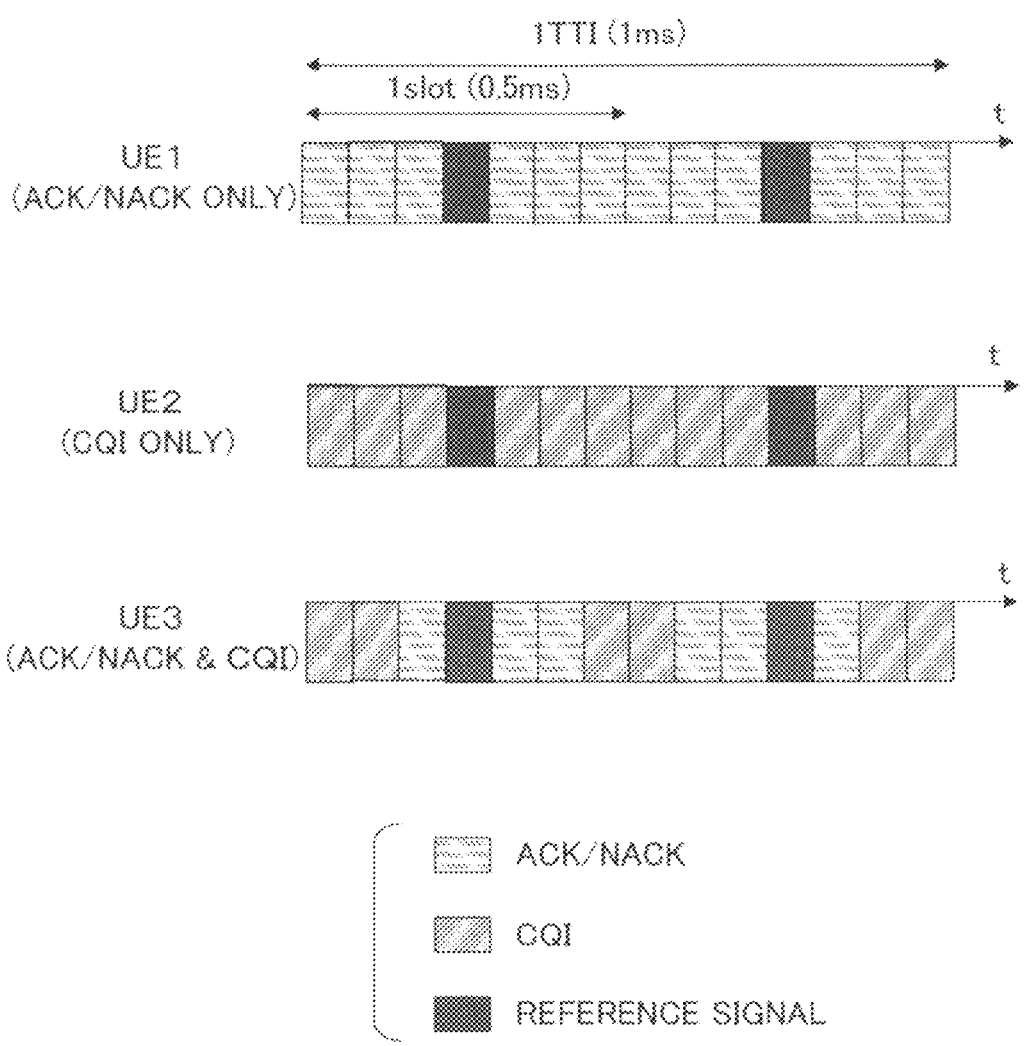

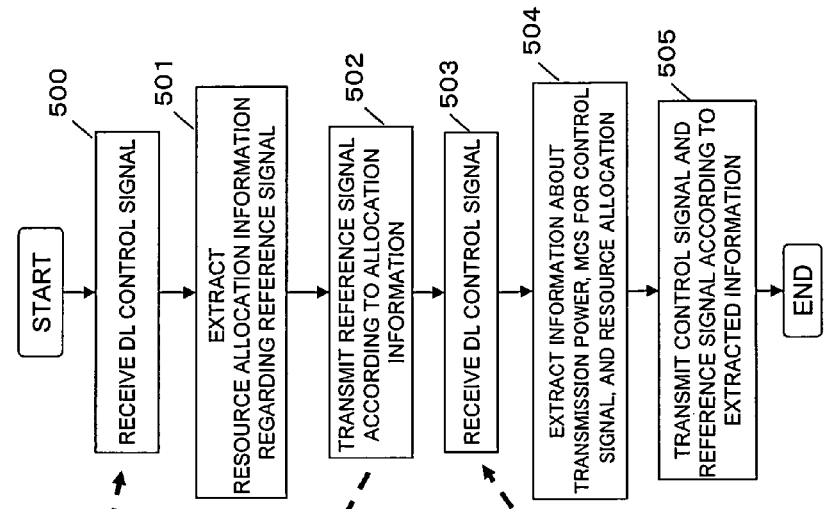
FIG.6B MOBILE STATION
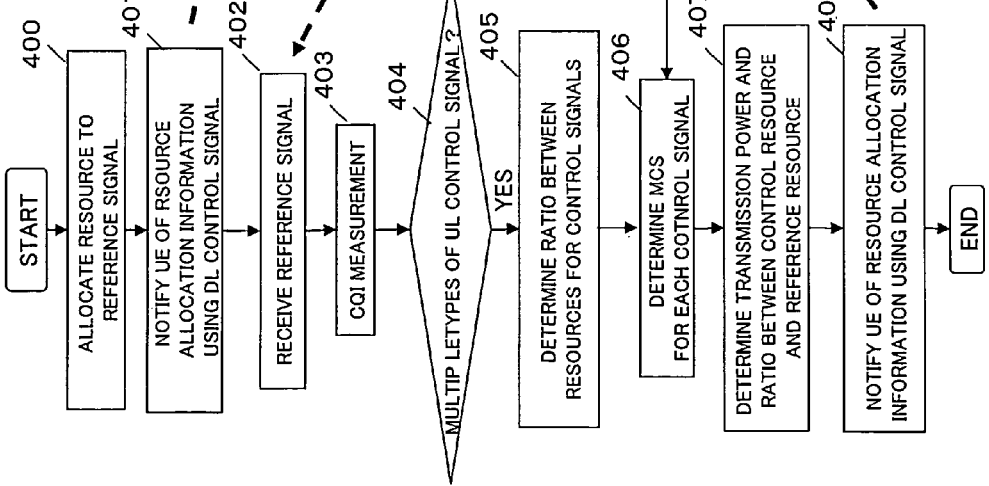
FIG.6A BASE STATION

FIG.8

| CQI LEVEL | NOTIFICATION NO. | TYPE OF CONTROL SIGNAL | MODULATION SCHEME | ENCODING RATE | REQUIRED VALUE OF TRANSMISSION POWER | REFERENCE RATIO (REFERENCE: ACK/NACK:CQI) |
|---|---|---|---|---|---|---|
| 1 | 1 | ACK/NACK | BPSK | 0.1 | $P_1$ | 4:10:0 |
|   | 2 | CQI | QPSK | 0.25 | $P_1$ | 4:0:10 |
|   | 3 | ACK/NACK&CQI |   |   |   |   |
| 2 | 4 | ACK/NACK | BPSK | 0.1 | $P_2$ | 4:10:0 |
|   | 5 | CQI | QPSK | 0.25 | $P_2$ | 4:0:10 |
|   | 6 | ACK/NACK&CQI | BPSK/QPSK | 0.125/0.25 | $P_1$ | 4:8:2 |
| ... |   |   |   |   |   |   |
| $Q_N$ | $3Q_N-2$ | ACK/NACK | BPSK | 0.1 | $P_{M-1}$ | 4:10:0 |
|   | $3Q_N-1$ | CQI | 16QAM | 0.5 | $P_{M-1}$ | 2:0:12 |
|   | $3Q_N$ | ACK/NACK&CQI | BPSK/16QAM | 0.25/0.5 | $P_M$ | 2:4:8 |

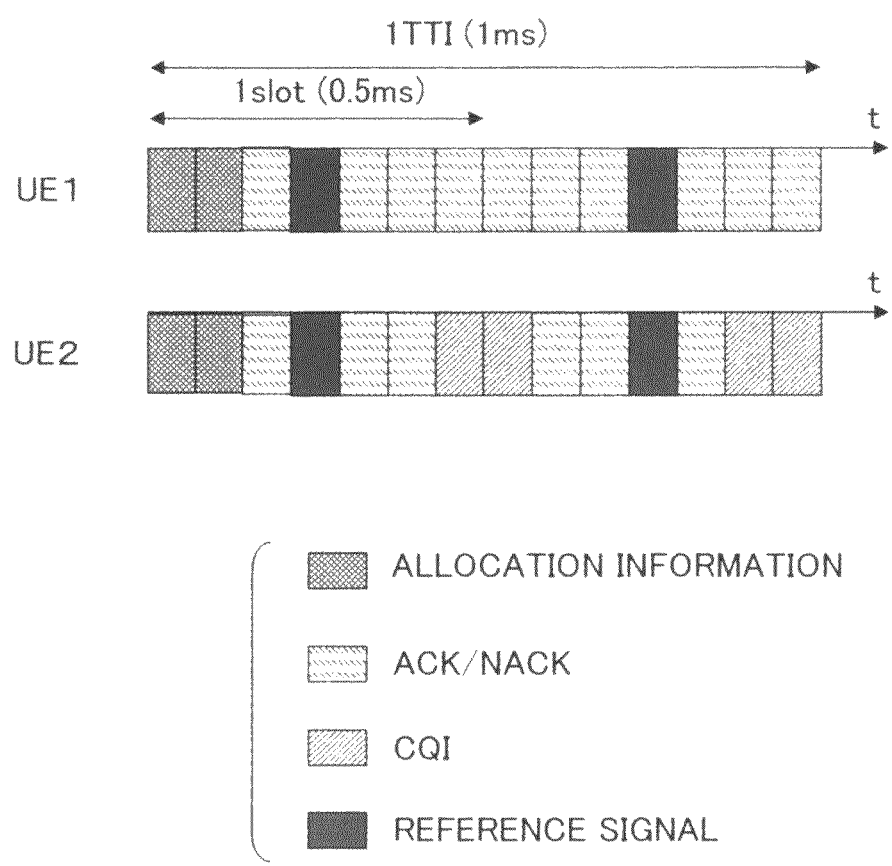

| CQI LEVEL | TYPE OF CONTROL SIGNAL | NUMBER OF LBS PER TTI ALLOCATED TO REFERENCE SIGNAL | NUMBER OF BITS INPUT TO ENCODING SECTION (ACK/NACK : CQI) |
|---|---|---|---|
| 1 | ACK/NACK | 4 | 1 : 0 |
|   | CQI | 2 | 0 : 4 |
| 2 | ACK/NACK | 4 | 1 : 0 |
|   | CQI | 2 | 0 : 8 |
|   | ACK/NACK&CQI | 2 | 1 : 4 |
| 3 | ACK/NACK | 2 | 1 : 0 |
|   | CQI | 2 | 0 : 12 |
|   | ACK/NACK&CQI | 2 | 1 : 6 |
| 4 | ACK/NACK | 2 | 1 : 0 |
|   | CQI | 2 | 0 : 16 |
|   | ACK/NACK&CQI | 2 | 1 : 8 | ns
RESOURCE ALLOCATION CONTROL METHOD AND DEVICE IN MOBILE RADIO COMMUNICATIONS SYSTEM

BACKGROUND OF THE INVENTION

1. Field of the Invention

This application is based upon and claims the benefit of priority from Japanese Patent Application No. 2007-068879, filed on Mar. 16, 2007, the disclosure of which is incorporated herein in its entirety by reference.

The present invention relates to a mobile radio communications system and, more particularly, to a control method and device of resource allocation among control signals and reference signals (pilot signals).

2. Description of the Related Art

In Long Term Evolution (LTE), which is currently being standardized by the 3rd Generation Partnership Project (3GPP), single-carrier transmission is employed as an uplink access scheme in broadband radio access. The single-carrier transmission is an access scheme excellent in power efficiency because the peak-to-average power ratio (PAPR) can be suppressed low in comparison with multi-carrier transmission such as orthogonal frequency division multiplexing (OFDM). Therefore, considering that a mobile station, which is also called user equipment (UE), has limited battery capacity, the single-carrier transmission can be said to be an access scheme suitable for uplink. Hereinafter, a technology related to the present invention will be described, taking an LTE-based radio communications system as an example.

FIG. 1A is a block diagram showing a radio mobile communications system in general, and FIG. 1B is a format diagram showing a signal frame structure in LTE. As shown in FIG. 1B, according to LTE, one slot is equivalent to 0.5 msec and is composed of seven long blocks (LBs), and two slots constitute one transmission time interval (TTI). Incidentally, the TTI is as long a time interval as a plurality of blocks (a transport block set) transferred at a time between the physical layer and the MAC layer. In this figure, the bandwidth (the number of subcarriers) of a single frequency resource block (RB) is 12 subcarriers, and control signals and/or reference signals of individual mobile stations (UEs) are placed in each frequency resource block. In FIG. 1B, a resource block is composed of 7 LBs in time direction and 12 subcarriers in frequency direction.

An uplink control signal needs to carry a data-non-associated control signal, which is feedback information about a downlink signal. The data-non-associated control signal includes at least "Acknowledgment/Negative Acknowledgment" (hereinafter, referred to as "ACK/NACK"), which indicates whether or not downlink information has been received without error, as well as channel quality indicator information (hereinafter, referred as "CQI"), which indicates the quality of the downlink channel, and the like. Hereinafter, this data-non-associated control signal will be simply referred to as "control signal."

In such a control signal, it is preferable that the transmission delay of ACK/NACK be short. As for CQI, the transmission frequency is determined with consideration given to the transmission overhead and the moving speed of the mobile station. Accordingly, there are some occasions when the frequency of transmission of ACK/NACK differs from that of CQI, in which case mobile stations transmitting three types of control signals coexist within a single TTI: those which transmit ACK/NACK only, those which transmit CQI only, and those which transmit both of ACK/NACK and CQI. In addition, since the amount of ACK/NACK information is smaller than that of CQI information, these three types of control signals differ from each other in amount of information and transmission bandwidth.

In LTE, it is being considered that frequency division multiplexing (FDM) and/or code division multiplexing (CDM) are used to multiplex users with respect to uplink control signals (see 3GPP TSG-RAN WG1 #47 R1-063448, Qualcomm Europe, "Structure and Link Analysis UL Control Signaling," November 2006). In the case of CDM, CAZAC (Constant Amplitude Zero Auto-Correlation) sequence is predominant to be used for spread signals. For example, as one example of CAZAC sequence, Zadoff-Chu sequence represented by the following equation 1 has been known (see B. M. Popovic, "Generalized Chirp-Like Polyphase Sequences with Optimum Correlation Properties," IEEE Transactions on Information Theory, Vol. 38, No. 4, PP. 1406-1409, July 1992):

$$c_k(n) = \begin{cases} \exp\left[\frac{j2\pi k}{L}\left(\frac{n^2}{2}+n\right)\right] & \text{where } L \text{ is even} \\ \exp\left[\frac{j2\pi k}{L}\left(n\frac{n+1}{2}+n\right)\right] & \text{where } L \text{ is odd} \end{cases} \quad \text{(Equation 1)}$$

where n=0, 1, ..., and (L−1), L is the length of a sequence, and k is a sequence number which is an integer prime to L.

CAZAC sequences are sequences which have constant amplitude in both of the time and frequency domains and produce an autocorrelation value of zero at a phase difference of any value other than zero. With the CAZAC sequences, because of their property of perfect autocorrelation, signal separation is possible without interference from other users in the case of CDM. Moreover, the CAZAC sequences are suitable for use in channel estimation in the frequency domain because of the constant amplitude also in the frequency domain. Accordingly, a CAZAC sequence is used as a reference signal (pilot signal) sequence.

FIG. 2 is a diagram showing an example of the allocation of resources to a control signal ACK/NACK and/or a control signal CQI in the frame format in LTE. As mentioned above, according to LTE, one slot is equivalent to 0.5 msec and is composed of seven long blocks (LBs), and two slots constitute one transmission time interval (TTI). In this example, where the control signals of individual mobile stations (UEs) are code-division-multiplexed and CAZAC sequences are used as spreading codes, only those mobile stations which transmit signals using the same transmission bandwidth can be orthogonally multiplexed. Additionally, it is assumed that every mobile station performs single-carrier transmission, with no application of multi-code transmission or multi-carrier transmission, by which the PAPR is increased.

In this case, to achieve the orthogonality between the control signals of mobile stations, it is necessary to time-division-multiplex ACK/NACK and CQI at LB level. In FIG. 2, shown is an example where, within a TTI, resources are allocated to ACK/NACK only (except a reference signal) for a mobile station UE1, resources are allocated to CQI only (except a reference signal) for a mobile station UE2, and resources are allocated to ACK/NACK and CQI (except a reference signal) for a mobile station UE3. The reference signals are used to demodulate control signals.

However, problems arise that required conditions are not satisfied and that the efficiency of resource usage declines, if resources are allocated in a fixed amount to a plurality of control signals which differ from each other in amount of information, transmission frequency, required condition of quality, and the like, such as the above-mentioned three types of control signals: ACK/NACK only, CQI only, and ACK/NACK and CQI (hereinafter, also referred to as "ACK/NACK & CQI" where appropriate).

For example, referring again to FIG. 2, the control signals of the mobile station UE3, ACK/NACK & CQI, are time-division-multiplexed at LB level. In this case, assuming that the mobile stations UE1 to UE3 are present on the border of a cell in a power-limited multi-cell environment, the respective control resources for ACK/NACK and CQI of the mobile station UE3 are reduced in comparison with those for ACK/NACK and CQI of the other mobile stations UE1 and UE2. Accordingly, at least the properties of ACK/NACK & CQI of the mobile station UE3 are more degraded than the property of ACK/NACK of the mobile station UE1 and the property of CQI of the mobile station UE2.

As described above, if resources are allocated in a fixed amount to a plurality of control signals which differ from each other in amount of information, transmission frequency, required condition of quality, and the like, problems arise that required conditions are not satisfied because of a lack of the amount of a resource allocated, and that the efficiency of resource usage declines because of the allocation of an excessive amount of a resource. Particularly when resources are allocated to both of ACK/NACK and CQI in one TTI, fixing the ratio between resources for ACK/NACK and CQI leads to a problem.

SUMMARY OF THE INVENTION

An object of the present invention is to provide a resource allocation control method and device that can achieve the efficient allocation of control resource between multiple types of control signals.

According to the present invention, a method of controlling resource allocation in a resource block including control resources used for a plurality of types of control signals and reference resources used for reference signals, to radio communications between a plurality of radio stations, includes: measuring propagation channel quality between a first radio station and a second radio station at one or both of the first and second radio stations; determining resource apportionment of the plurality of types of control signals in the control resources based on the propagation channel quality; and notifying the other one of the first and second radio stations of the resource apportionment.

As described above, depending on the propagation channel quality, optimum amounts of resources can be allocated respectively to multiples types of control signals having different requirements.

BRIEF DESCRIPTION OF THE DRAWINGS

FIG. 2 is a diagram showing an example of the allocation of resources to a control signal ACK/NACK and/or a control signal CQI in the frame format in LTE.

FIG. 6A is a flow chart of the operations of the base station executing resource allocation control according to the first exemplary embodiment of the present invention.

FIG. 6B is a flow chart of the operations of the mobile station in the first exemplary embodiment of the present invention.

FIG. 8 is a table schematically showing a second example of resource apportionment according to the first exemplary embodiment of the present invention.

FIG. 12 is a diagram showing the allocation of resources to a reference signal and a control signal ACK/NACK and/or a control signal CQI according to the second exemplary embodiment of the present invention.

DETAILED DESCRIPTION OF THE PREFERRED EMBODIMENTS

1. Basic Concept

Taking ACK/NACK, CQI, and ACK/NACK & CQI as an example of different types of control signals, the basic concept of the present invention will be described.

First, when channel quality is bad, the probability that a resource is allocated to data is small, resulting in the decreased degree of importance of CQI, therefore not leading to great degradation in throughput. On the other hand, when channel quality is good, efficiency in channel-dependent scheduling can be enhanced by increasing the number of transmission bits for CQI. Hence, according to the present invention, within a resource block of a fixed amount including control and reference resources, the ratio between the control resource used for ACK/NACK and the control resource used for CQI is controlled depending on the channel quality. Moreover, it is also possible to change the ratio between the control and reference resources within a resource block. Additionally, a format to be used can be restricted by changing the modulation scheme and encoding rate (MCS: Modulation and Coding Scheme) for each control signal, and by controlling the transmission power. Here, the format is a signal placement structure which is determined depending on the positions of control and reference signals. For example, formats can be said to be the same if the positional relationship among each control signal and reference signal is the same. Formats are said to be different if, as UE1 to UE3 show in FIG. 2, the positions (LB positions) at which control signals are respectively transmitted differ among mobile stations. Hereinafter, exemplary embodiments of the present invention will be described in detail.

2. First Exemplary Embodiment

In a first exemplary embodiment of the present invention, a base station (also referred to as "NodeB") takes initiative in controlling the ratio between control resources within a resource block, and in controlling the ratio between control and reference resources within a resource block.

2.1) Base Station

Figure 1A:
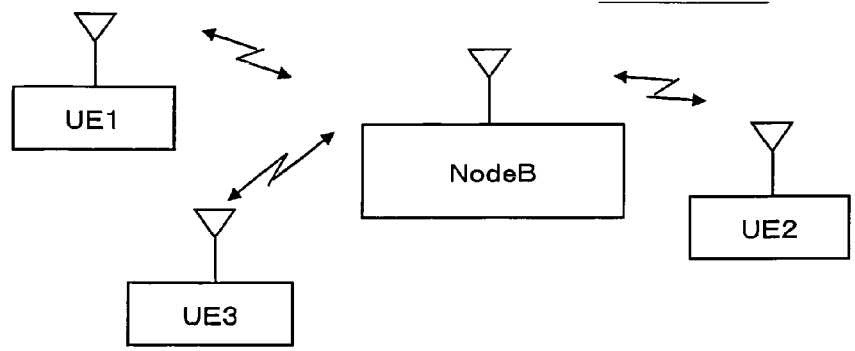
FIG. 1A is a block diagram showing a radio mobile communications system in general.
Figure 1B:
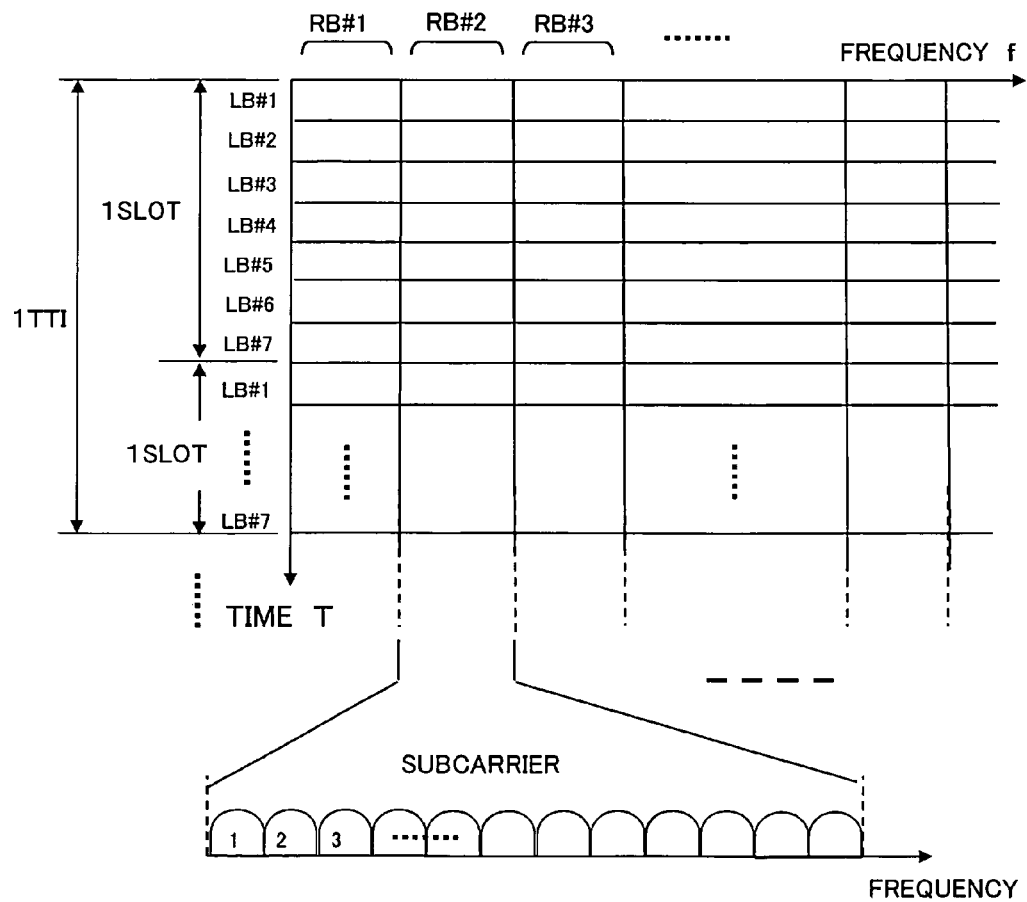
FIG. 1B is a format diagram showing a signal frame structure in LTE.
Figure 3:
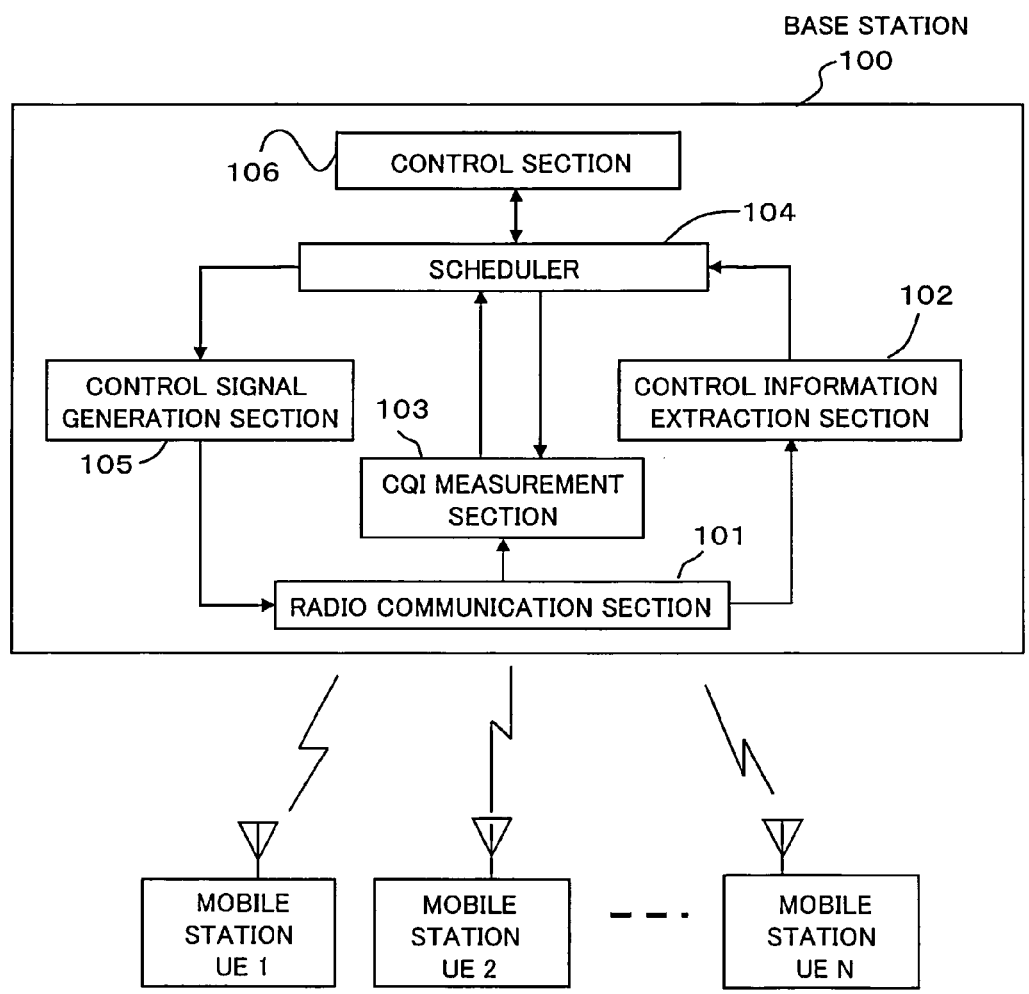
FIG. 3 is a block diagram showing a schematic configuration of a base station in a mobile radio system according to a first exemplary embodiment of the present invention.

FIG. 3 is a block diagram showing a schematic configuration of a base station in a mobile radio system according to the first exemplary embodiment of the present invention. Here, it is assumed that the base station 100 accommodates N mobile stations (UEs) 1 to N.

At the base station 100, a radio communication section 101 demodulates an uplink control signal received from a mobile station, in accordance with a reference signal similarly received, and outputs the demodulated control signal and the reference signal to a control information extraction section 102 and a CQI measurement section 103 respectively. The control information extraction section 102 extracts resource allocation information, such as a request for resource allocation here, and outputs the extracted information to a scheduler 104.

The CQI measurement section 103 performs CQI measurement using the reference signal obtained from the radio communication section 101, in response to a request to measure CQI for a mobile station designated by the scheduler 104, and outputs the measured CQI value back to the scheduler 104. The scheduler 104, under the control of a control section 106, performs resource allocation within a resource block for the mobile station based on the measured CQI value, and outputs information regarding this resource allocation (resource allocation information) to a control signal generation section 105. The control signal generation section 105 generates a control signal containing this resource allocation information for the mobile station and transmits the control signal to the mobile station through the radio communication section 101.

The control section 106 controls the overall operations of the base station 100. Scheduling by the scheduler 104 is performed under the control of the control section 106. In general, the control section 106 performs various kinds of control, such as resource allocation control, by executing control programs on a program-controlled processor such as a central processing unit (CPU).

2.2) Mobile Station

Figure 4:
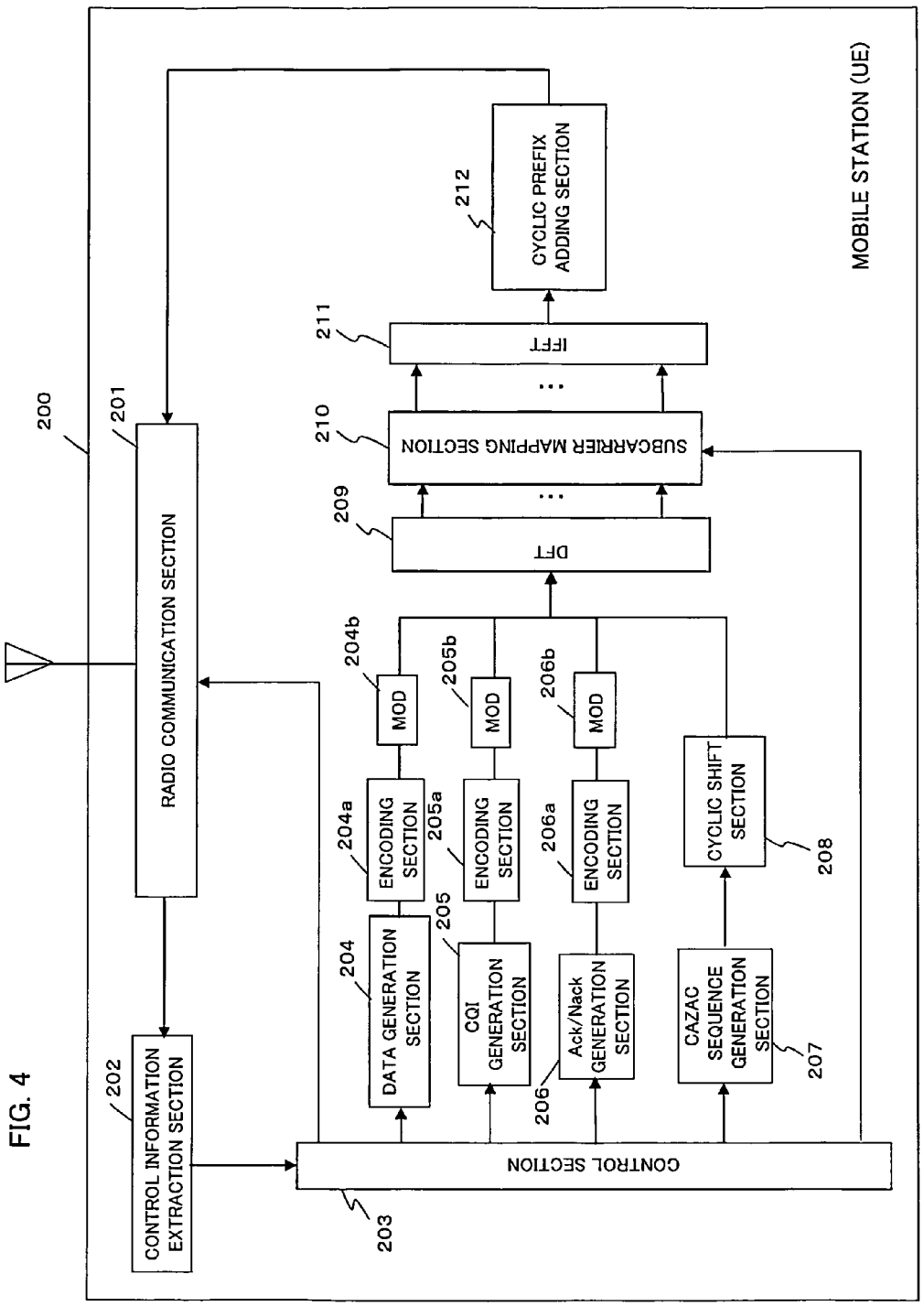
FIG. 4 is a block diagram showing a schematic configuration of a mobile station (UE) in the mobile radio system according to the first exemplary embodiment of the present invention.
Figure 5:
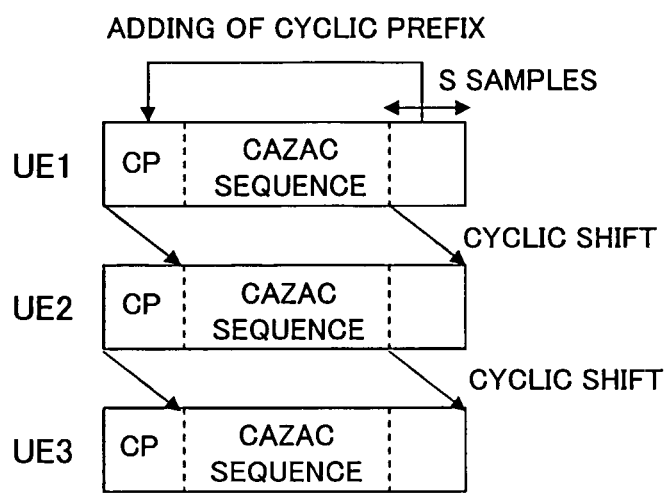
FIG. 5 is a schematic diagram showing an example of CAZAC sequences with cyclic shifts added thereto.

FIG. 4 is a block diagram showing a schematic configuration of a mobile station (UE) in the mobile radio communications system according to the first exemplary embodiment of the present invention, and FIG. 5 is a schematic diagram showing an example of CAZAC sequences with cyclic shifts added thereto.

Referring to FIG. 4, in a mobile station 200, a radio communication section 201 demodulates a downlink control signal and/or downlink data received from the base station 100, by using a reference signal similarly received, and outputs the demodulated control signal to a control information extraction section 202. The control information extraction section 202 extracts resource allocation information and information regarding a desired value of transmission power and outputs the extracted information to a control section 203.

First, in accordance with the resource allocation information and information regarding the desired value of transmission power, the control section 203 controls each of the radio communication section 201, a data generation section 204, a CQI generation section 205, an ACK/NACK generation section 206, a CAZAC sequence generation section 207, a cyclic shift section 208, and a subcarrier mapping section 210. Data and/or control signals generated by the data generation section 204, CQI generation section 205, and ACK/NACK generation section 206 are encoded by encoding sections 204a, 205a, and 206a respectively, then modulated by modulation sections 204b, 205b, and 206b respectively, and then output to a discrete Fourier transformation (DFT) section 209. As for the reference signal, in accordance with the resource allocation information from the control section 203, the CAZAC sequence generation section 207 generates a CAZAC sequence, and the cyclic shift section 208 adds to the CAZAC sequence as many cyclic shifts as are equivalent to a time length uniquely assigned to the mobile station and outputs a resultant cyclically shifted CAZAC sequence to the DFT section 209. The orthogonality between mobile stations can be accomplished by setting the amount of a cyclic shift equal to or larger than a maximum channel delay. For example, the amount of a cyclic shift is set equal to the length of a cyclic prefix. Incidentally, the cyclic shift section 208 may also be placed after an inverse Fourier transformation (IFFT) section 209 and before a cyclic prefix adding section 212.

Note that if the encoding rate and/or modulation scheme (or the number of modulation levels) are also changed in accordance with the control information from the base station 100, the control section 203 controls the encoding sections 204a to 206a and/or modulation sections 204b to 206b in accordance with the control information.

After the DFT section 209 transforms the data and/or control signals into signals in the frequency domain, the signals of individual frequency components are output to the subcarrier mapping section 210. In accordance with the frequency resource allocation information from the control section 203, the subcarrier mapping section 210 chooses which signals in the frequency domain will be transmitted (subcarrier mapping). For example, in accordance with the frequency resource allocation information, the subcarrier mapping section 210 can perform subcarrier mapping by localized FDM (LFDM), in which contiguous subcarriers are used, or subcarrier mapping by distributed FDM (DFDM), in which subcarriers at fixed intervals are used. The signals in the frequency domain thus subcarrier-mapped are transformed into signals in the time domain by the IFFT section 211, and then a cyclic prefix (CP) is added by the cyclic prefix adding section 212. The data, control signals, and reference signal thus output from the cyclic prefix adding section 212 are transmitted to the base station 100 through the radio communication section 201. At this time, the control section 203 performs transmission power control by controlling the radio communication section 201 in accordance with the information regarding the required value of transmission power obtained from the control information extraction section 202.

2.3) Resource Allocation Control

With the above-described system configuration, resource allocation control according to the first exemplary embodiment of the present invention is performed as described below.

FIG. 6A is a flow chart of the operations of the base station executing resource allocation control according to the first exemplary embodiment of the present invention, and FIG. 6B is a flow chart of the operations of the mobile station. Note that in FIGS. 6A and 6B, the transmission/reception relationship between the base station and the mobile station is indicated by broken arrows. In FIGS. 6A and 6B, uplink and downlink are denoted by UL and DL, respectively.

Referring to FIG. 6A, for a mobile station (UE), the base station 100 allocates a resource to an uplink reference signal to measure the quality of an uplink channel (Step 400). The control signal generation section 105 generates a downlink control signal containing information regarding this resource allocation, which is then transmitted from the radio communication section 101 to the mobile station in question (Step 401). This control signal is transmitted through a physical downlink control channel (PDCCH) or the like.

The mobile station responds to this control signal as will be described later, and the radio communication section 101 of the base station 100 receives the uplink reference signal from the mobile station (Step 402). Then, the CQI measurement section 103 measures the uplink CQI (Step 403).

Next, the scheduler 104 determines whether or not to notify that the mobile station will transmit multiple types of uplink control signals (Step 404). In the case of notifying that the mobile station will transmit multiple types of uplink control signals (Step 404: YES), the scheduler 104 determines the ratio between the resources for the control signals, based on the CQI measured at Step 403 (Step 405). This determination of the resource ratio will be described later. Further, based on the CQI, the scheduler 104 determines the modulation scheme and encoding rate (MCS: Modulation and Coding Scheme) for each control signal (Step 406). Note that when the uplink control signal to be transmitted is of a single type (Step 404: NO), then Step 406 is performed, with Step 405 being skipped.

Next, the scheduler 104 determines the transmission power and the ratio between the reference signal and the control signals in accordance with the CQI, which will be described later (Step 407). The control signal generation section 105 generates a downlink control signal containing information regarding the thus-determined resource allocation (resource allocation information), which is then transmitted from the radio communication section 101 to the mobile station (Step 408). The resource allocation information includes the ratio between the resources for the control signals, modulation scheme and coding rate (MCS) for each control signal, required value of transmission power, ratio between the resources for the reference signal and the control signals, and the like. For the transmission to the mobile station, PDCCH is used.

Referring to FIG. 6B, in the mobile station 200, first, the radio communication section 201 receives a downlink control signal transmitted by the base station 100 (the downlink control signal transmitted at Step 401 in FIG. 6A) (Step 500). The control information extraction section 202 then extracts information regarding the allocation of a resource to an uplink reference signal from the downlink control signal (Step 501). The control section 203 controls the CAZAC sequence generation section 207 and the cyclic shift section 208, thereby transmitting the uplink reference signal for CQI measurement in accordance with the information extracted at Step 501 (Step 502). This uplink reference signal is received by the base station 100 (Step 402 in FIG. 6A).

Subsequently, the radio communication section 201 of the mobile station 200 receives a downlink control signal from the base station 100 (Step 503), and the control information extraction section 202 extracts information regarding the allocation of resources to uplink control signals (resource allocation information) (Step 504). This resource allocation information received from the base station 100 includes the above-described information determined at Step 404 through Step 407, namely, the ratio between the resources for the control signals, MCS for each control signal, required value of transmission power, ratio between the resources for the reference signal and the control signals, and the like. Lastly, the control section 203 transmits the uplink control signals and the reference signal in accordance with the extracted resource allocation information (Step 505). Here, the uplink control signals are transmitted through a physical uplink control channel (PUCCH) or the like.

2.4) Resource Allocation Control (Example I)

Figures 7A, 7B:
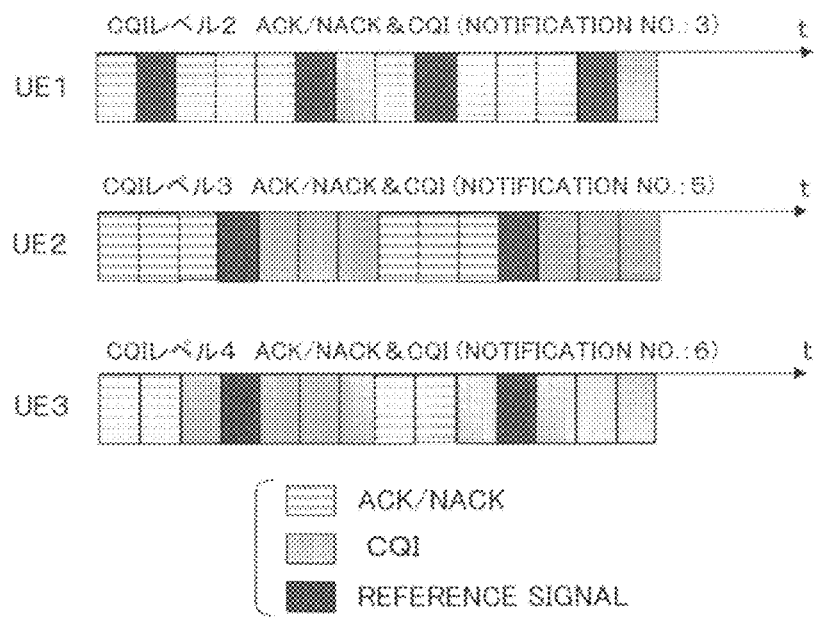
FIG. 7A is a table schematically showing a first example of resource apportionment according to the first exemplary embodiment of the present invention.
FIG. 7B is a diagram showing the allocation of resources to a control signal ACK/NACK and/or a control signal CQI, according to the resource apportionment shown in FIG. 7A.

FIG. 7A is a table schematically showing a first example of resource apportionment according to the first exemplary embodiment of the present invention, and FIG. 7B is a diagram showing the allocation of resources to a control signal ACK/NACK and/or a control signal CQI according to the resource apportionment shown in FIG. 7A. FIG. 7A shows the relationship between the measured channel quality (CQI level) and the frame format (ratio among the resource used for ACK/NACK, the resource used for CQI, and the reference resource). It is assumed that CQI in FIG. 7A has four levels (levels 1 to 4), and that the channel quality becomes better as the CQI level rises from 1 to 4. Note, however, that although four CQI levels are shown here as an example, the number of CQI levels is not limited to this. It is also possible to perform the resource allocation control, with as many CQI levels as necessary being set.

When resources are apportioned to the control signals ACK/NACK and CQI within a single transmission time interval (TTI), the ratio of the resource used for ACK/NACK is reduced while the ratio of the resource used for CQI is increased as the CQI level rises, as shown in FIG. 7A. For example, for ACK/NACK & CQI at a CQI level of 2, the ratio of the resource used for ACK/NACK is 8 and the ratio of the resource used for CQI is 2, but for ACK/NACK & CQI at a CQI level of 4, the ratio of the resource used for ACK/NACK is 4 and the ratio of the resource used for CQI is 8.

Moreover, channel estimation needs to be done for the demodulation of control signals such as ACK/NACK and CQI, and precision in channel estimation is dependent on the signal-to-noise ratio (SNR) of a reference signal. Accordingly, when a channel is in bad condition, the ratio of the reference resource is made larger than when a channel is in good condition, thereby increasing the SNR of the reference signal. For example, for CQI or ACK/NACK & CQI, the ratio of the resource used for the reference signal is 2 when the CQI level=4, at which the channel quality is good, but the ratio of the resource used for the reference signal is increased to 4 when the CQI level drops to 2 or below.

Incidentally, if such a table is provided to each of the base station 100 and the mobile station 200 and a notification number is assigned beforehand to each control item (resource ratio associated with a CQI level and with a control signal type), then the base station 100 can perform similar resource allocation control only by notifying a mobile station of a notification number. This makes it possible to reduce the number of transmission bits for a downlink control signal.

In the example of frame formats for mobile stations UE1 to UE3 shown in FIG. 7B, the control signals of the plurality of mobile stations are code-division-multiplexed, and ACK/NACK and CQI of each mobile station are time-division-multiplexed at LB level. For example, with respect to the mobile station UE1, the CQI level is 2, at which the channel does not have very good quality. Therefore, when resources are allocated to both of ACK/NACK and CQI in one ITT, the resource ratio is set in accordance with the table shown in FIG. 7A so that ACK/NACK:CQI:reference signal=8:2:4 (here, the notification number is 3). Moreover, when the CQI level is 3 as in the case of the mobile station UE2, at which the channel quality is relatively good, then, if resources are allocated to both of ACK/NACK and CQI in one ITT, the resource ratio is set in accordance with the table shown in FIG. 7A so that ACK/NACK:CQI:reference signal=6:6:2 (here, the notification number is 5). With respect to the mobile station UE3, the CQI level is 4, which means that the channel quality is good. In this case, similarly, when resources are allocated to both of ACK/NACK and CQI in one TTI, the resource ratio is set in accordance with the table shown in FIG. 7A so that ACK/NACK:CQI:reference signal=4:8:2 (here, the notification number is 6).

Incidentally, it is assumed that resources are not allocated to ACK/NACK&CQI in a TTI when the CQI level is 1, because the channel quality is bad. In this case, ACK/NACK or CQI is to be transmitted in a subsequent TTI.

2.5) Resource Allocation Control (Example II)

In the above-described first example, the frame format in a resource block only is changed depending on the channel quality. However, in addition to the change of the frame format, the modulation scheme and encoding rate (MCS) and the desired value of transmission power also can be changed. The following is a specific example in this case.

FIG. 8 is a table schematically showing a second example of resource apportionment according to the first exemplary embodiment of the present invention. FIG. 8 shows the relationship among the measured channel quality (CQI level), frame format, MCS, and required value of transmission power. Here, it is assumed that CQI has $Q_N$ levels, and that the channel quality becomes better as the CQI level rises from 1 to $Q_N$. Moreover, it is assumed that the required value (P) of transmission power is controlled at M levels, where $P_1 > P_2 > \ldots > P_M$.

As in the case of the above-described first example, as the CQI level rises, the ratio of the resource used for ACK/NACK is reduced while the ratio of the resource used for CQI is increased. In addition, when the CQI level is high, the modulation scheme for CQI is changed from the quadrature phase shift keying (QPSK) providing two-bit transmission, to the 16 quadrature amplitude modulation (16QAM), which is one of QAM schemes providing four-bit transmission, whereby the encoding rate is increased, thus increasing the number of transmission bits for CQI. Further, when the CQI level is high, the required value of transmission power is reduced, whereby interference power is reduced and the efficiency of power usage is increased.

Additionally, it is possible to reduce the number of transmission bits for a downlink control signal in comparison with the case of notifying each control item, by assigning a notification number to each of options which are the combinations of a frame format, MCS, and required value of transmission power.

Note that although the modulation scheme, encoding rate, and required value of transmission power are changed in addition to the frame format in this second example, it is also possible that a change is made in any one, or multiple selected ones, of the modulation scheme, coding rate, and required value of transmission power.

2.6) Advantages

As described above, according to the first exemplary embodiment of the present invention, the base station takes initiative in performing the control for allocating optimum amounts of resources to a reference signal and multiple control signals having different required conditions, such as ACK/NACK and CQI, depending on the channel quality. Thereby, the efficiency of resource usage can be enhanced. Moreover, according to the first exemplary embodiment, since the allocation of resources to the uplink signals is performed depending on the uplink CQI, it can be expected that the effects are brought about particularly in frequency division duplex (FDD) systems.

3. Second Exemplary Embodiment

According to the above-described first exemplary embodiment, it is the base station that takes initiative in performing the control for apportioning the control and reference resources within a resource block. However, it is also possible that a mobile station takes initiative in performing similar control.

3.1) Base Station and Mobile Station

Figure 9:
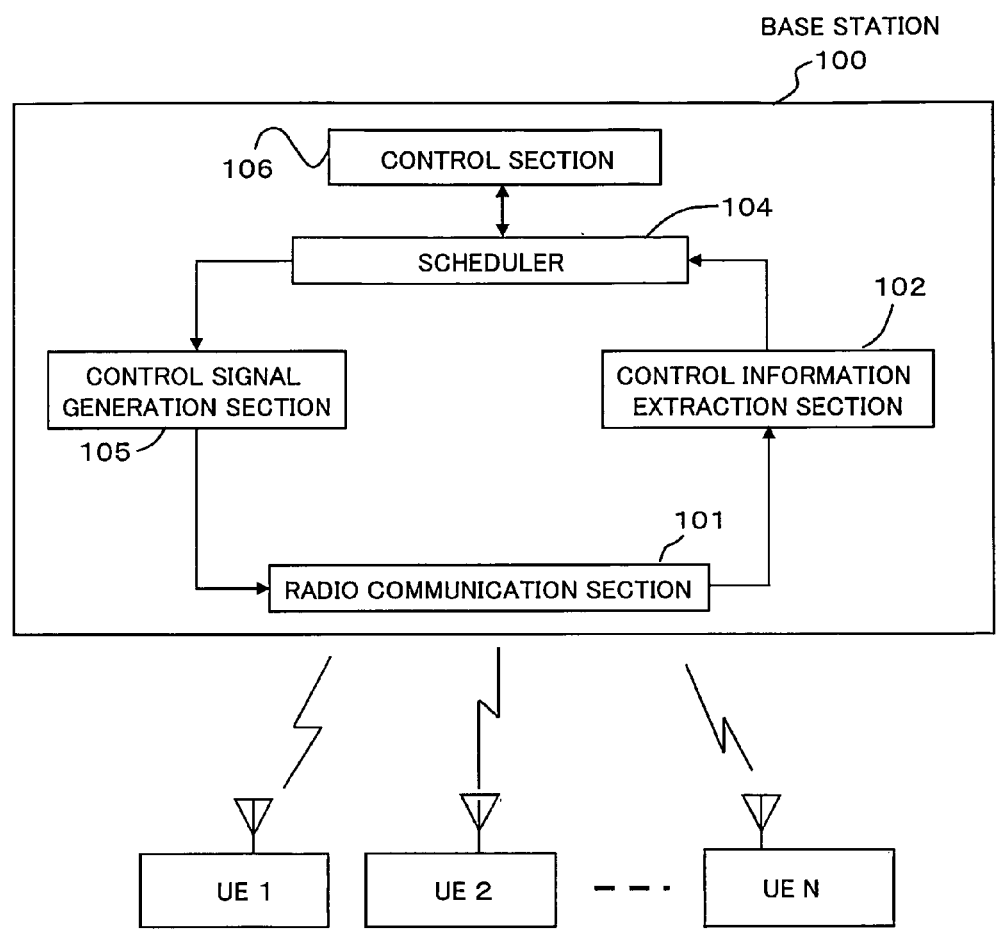
FIG. 9 is a block diagram showing a schematic configuration of a base station in a mobile radio system according to a second exemplary embodiment of the present invention.

FIG. 9 is a block diagram showing a schematic configuration of a base station in a mobile radio system according to a second exemplary embodiment of the present invention. The base station in the second exemplary embodiment has a configuration similar to that of the base station in the first exemplary embodiment described with reference to FIG. 3, except that the base station in the second exemplary embodiment is not provided with the CQI measurement section 103. Therefore, in the second exemplary embodiment, those blocks having the same functions as in the first exemplary embodiment are denoted by the same reference numerals, and description thereof will be omitted.

Figure 10:
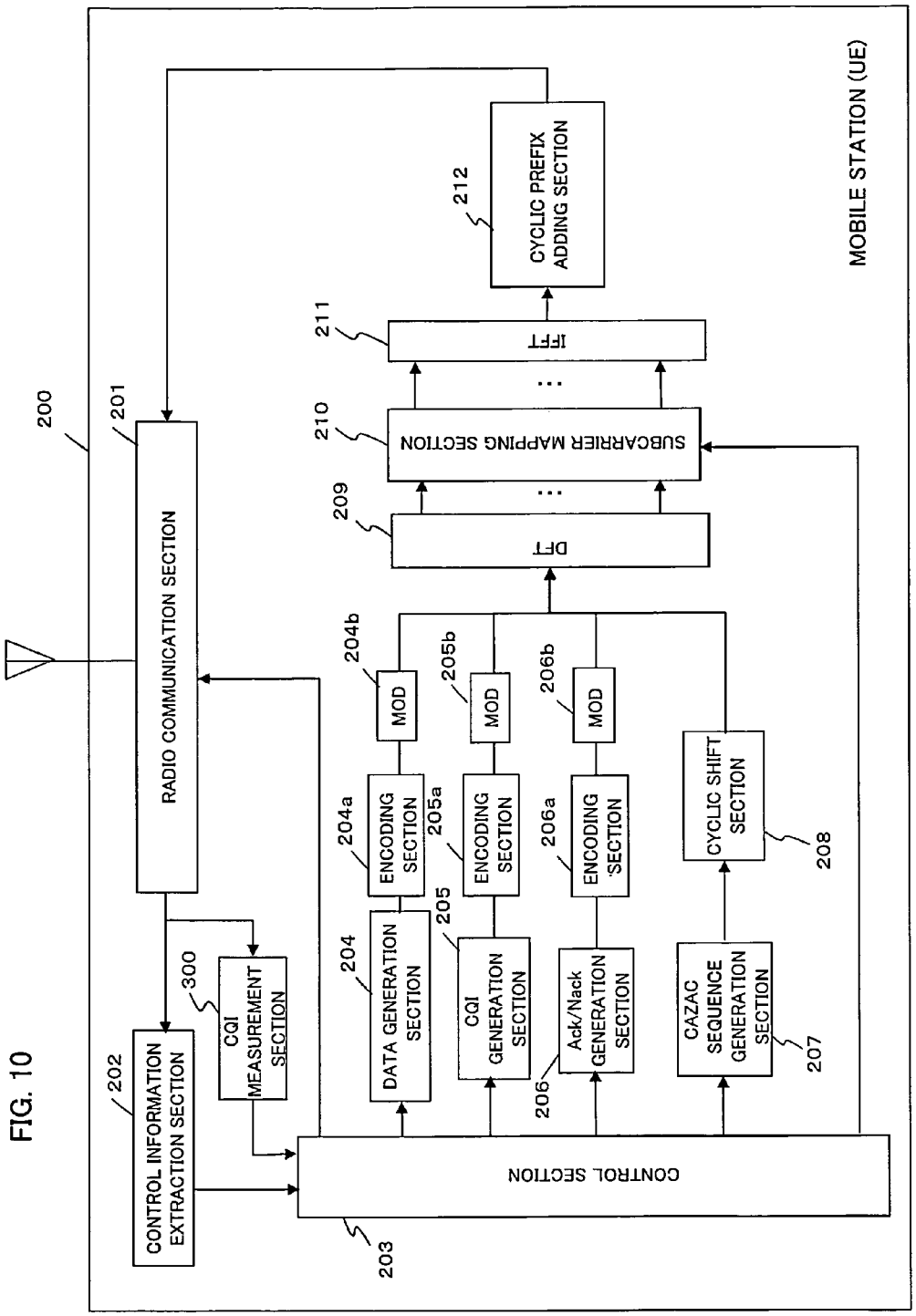
FIG. 10 is a block diagram showing a schematic configuration of a mobile station in the mobile radio system according to the second exemplary embodiment of the present invention.

Moreover, FIG. 10 is a block diagram showing a schematic configuration of a mobile station. This mobile station also has a configuration similar to that of the mobile station in the first exemplary embodiment described with reference to FIG. 4, except that a CQI measurement section 300 is added to the mobile station in the second exemplary embodiment. Therefore, in the second exemplary embodiment, those blocks having the same functions as in the first exemplary embodiment are denoted by the same reference numerals, and description thereof will be omitted. The CQI measurement section 300 performs CQI measurement using a reference signal received by the radio communication section 201 and outputs the result of the measurement to the control section 203.

3.2) Resource Allocation Control

With the above-described system configuration, resource allocation control according to the second exemplary embodiment is performed as described below.

Figure 11B:
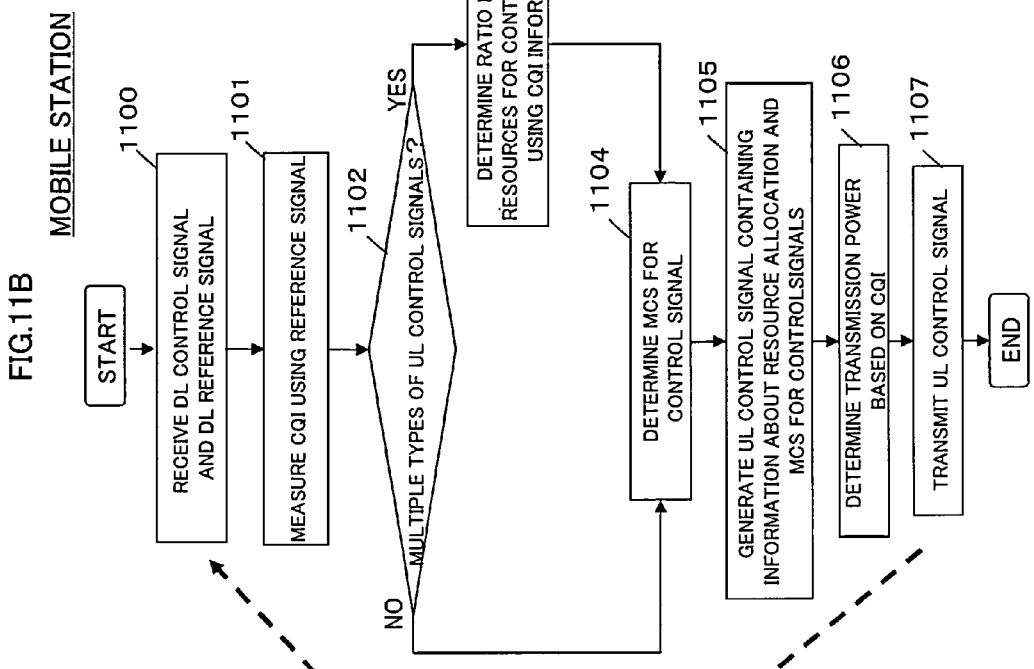
FIG. 11B is a flow chart of the operations of the mobile station executing resource allocation control according to the second exemplary embodiment of the present invention.
Figure 11A:
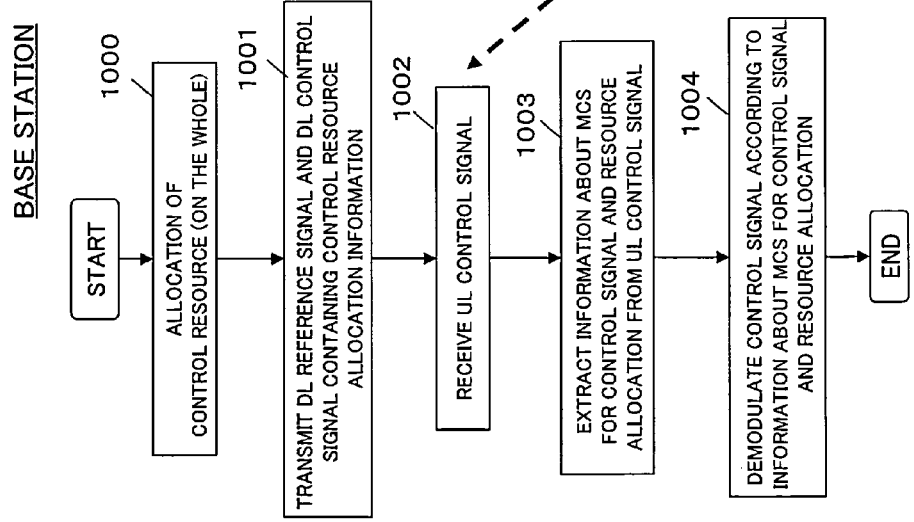
FIG. 11A is a flow chart of the operations of the base station in the second exemplary embodiment of the present invention.

FIG. 11A is a flow chart of the operations of the base station, and FIG. 11B is a flow chart of the operations of the mobile station executing resource allocation control according to the second exemplary embodiment of the present invention. Note that in FIGS. 11A and 11B, the transmission/reception relationship between the base station and the mobile station is indicated by broken arrows. In FIGS. 11A and 11B, uplink and downlink are denoted by UL and DL, respectively.

Referring to FIG. 11A, in the base station 100, the scheduler 104 performs the allocation of the control resources on the whole for each mobile station to transmit uplink control information (Step 1000). Then, resource allocation information containing information about these control resources, and a reference signal for CQI measurement are transmitted to each mobile station from the radio communication section 101 (Step 1001). In response to this, the radio communication section 101 receives from each mobile station an uplink control signal containing information about the ratio between the resources for control signals, information about the MCS for each control signal, and the like (Step 1002). This uplink control signal is transmitted through PUCCH or the like.

The control information extraction section 102 extracts the information about the ratio between the control resources, which is transmitted in a predetermined resource, from the uplink control signal received at Step 1002 (Step 1003), and demodulates information about ACK/NACK and/or CQI and the like by using this extracted information (Step 1004). Note that the predetermined resource used to transmit the information about the resource ratio is a resource composed of a given number of long blocks (LBs). For example, two LBs like the first two LBs shown in FIG. 12 are the predetermined resource.

Referring to FIG. 11B, in the mobile station 200, the radio communication section 201 receives a reference signal and a downlink control signal containing information about the allocation of the control resources on the whole from the base station 100 (Step 1100). The CQI measurement section 300 measures CQI by using the received reference signal (Step 1101). Next, the control section 203 determines whether or not it is necessary to transmit multiple types of uplink control signals (Step 1102).

When the result of the determination at Step 1102 is "YES," the control section 203 determines the ratio between the resources to be allocated to the multiple control signals, by using the CQI measured by the CQI measurement section 300 (Step 1103), and further determines the MCS for each control signal, based on the measured CQI (Step 1104). The ratio between the resources to be allocated, MCS, and the like may be determined as in the first exemplary embodiment, in a similar manner as shown in FIG. 7 or 8. When the uplink control signal is of a single type (not multiple types) (Step 1102: NO), then the determination of the MSC for each control signal (Step 1104) is performed, with Step 1103 being skipped.

Next, an uplink control signal is generated which contains, as uplink control information, information about the resource ratio and the MCS for each control signal determined at Step 1103 and Step 1104 respectively (Step 1105). Moreover, after the uplink transmission power is determined based on the CQI (Step 1106), the generated uplink control signal is transmitted to the base station 100 (Step 1107).

The base station 100 can demodulate the allocation information because the position at which the allocation information about the resource ratio is located is already known. Using the demodulated allocation information, ACK/NACK and/or CQI are demodulated (Step 1004 in FIG. 11A).

FIG. 12 is a diagram showing the allocation of resources to a reference signal and control signals ACK/NACK and CQI according to the second exemplary embodiment, showing an example of frame formats to transmit the uplink control signal generated at Step 1105 in FIG. 11B. The allocation information about the resource ratio is transmitted by using a predetermined resource within a resource block. In this example, the first two LBs are provided as the predetermined resource to transmit the allocation information, independently of the ratio between the resources for ACK/NACK and CQI. It is possible for the base station 100 to demodulate the allocation information because, as mentioned above, the position of the resource for the allocation information about the resource ratio is already known.

Note that, in the second exemplary embodiment, resource allocation within a resource block is performed based on the CQI measured using a downlink reference signal. However, resource allocation can also be performed based on the MCS for downlink data, the number of ACKs/NACKs (number of retransmissions) responding to uplink data, or the like.

3.3) Advantages

As described above, according to the second exemplary embodiment of the present invention, the mobile station takes initiative in performing the control for allocating optimum amounts of resources to a reference signal and multiple control signals having different required conditions, such as ACK/NACK and CQI, depending on the channel quality. Thereby, the efficiency of resource usage can be enhanced. Moreover, according to the second exemplary embodiment, the allocation of resources to uplink signals is performed in accordance with channel information such as the downlink CQI. Accordingly, it can be hoped that the effects are brought about particularly in time division duplex (TDD) systems, in which the same transmission frequencies are used for downlink and uplink.

4. Third Exemplary Embodiment

According to the above-described first and second exemplary embodiments, employed is a separate coding scheme by which, as shown in FIG. 4 or 10, the control signals CQI and ACK/NACK generated by the CQI generation section 205 and ACK/NACK generation section 206 respectively are encoded by the encoding sections 205a and 206a respectively (in which case a signal in each long block is multiplexed with others at LB level as shown in FIG. 7B or 12). However, the present invention is not limited to this scheme. It is also possible to employ Joint Coding by which multiple types of control signals are encoded by a single encoding section. According to this scheme, multiple types of control signals are multiplexed at bit level in each long block. Hereinafter, description will be given of the case where the joint coding scheme is employed in resource allocation control under the initiative of a base station as in the first exemplary embodiment. Note that the same will hold true in the case of resource allocation control under the initiative of a mobile station as in the second exemplary embodiment.

Figure 13:
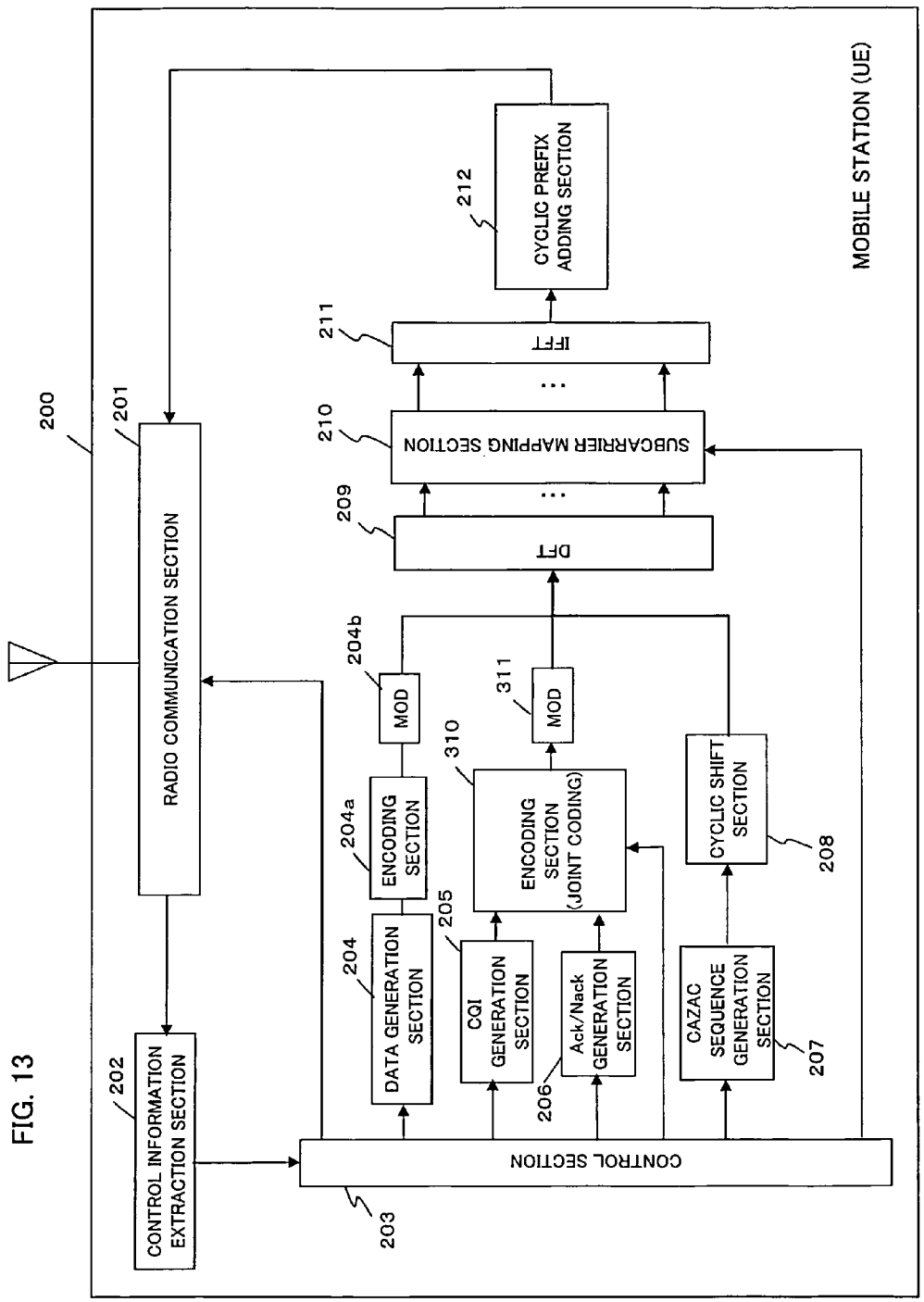
FIG. 13 is a block diagram showing a schematic configuration of a mobile station in a mobile radio system according to a third exemplary embodiment of the present invention.

FIG. 13 is a block diagram showing a schematic configuration of a mobile station in a mobile radio system according to a third exemplary embodiment of the present invention. The mobile station in the third exemplary embodiment has a configuration similar to that of the mobile station in the first exemplary embodiment, except that a single encoding section 310 is used in place of the encoding sections 205a and 206a in FIG. 4, and that a single modulation section 311 modulates an output from the encoding section 310. Therefore, in the third exemplary embodiment, those blocks having the same functions as in the first exemplary embodiment are denoted by the same reference numerals, and description thereof will be omitted.

The encoding section 310 receives control signals CQI and ACK/NACK composed different numbers of bits from the CQI generation section 205 and the ACK/NACK generation section 206 respectively as input. The encoding section 310 controls the encoding rate for each of the control signals, thereby producing the same number of output bits for each of the control signals, which are then output to the modulation section 311. Accordingly, while the reference and control signals are multiplexed at LB level, the multiple types of control signals are multiplexed at bit level. The ratio between the numbers of bits of these control signals multiplexed, encoding rate, is controlled depending on the channel quality, as described below. The same concept that is applied to the already-described "ratio between the resources to be allocated" can also be applied to the ratio between the numbers of bits in a single LB.

Figures 14A, 14B:
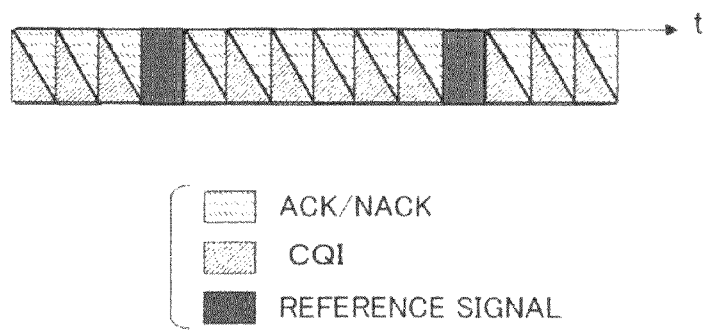
FIG. 14A is a table schematically showing an example of resource apportionment according to the third exemplary embodiment of the present invention.
FIG. 14B is a diagram showing an example of the allocation of resources to control signals ACK/NACK and CQI, according to the resource apportionment shown in FIG. 14A.

FIG. 14A is a table schematically showing an example of resource apportionment according to the third exemplary embodiment of the present invention, and FIG. 14B is a diagram showing an example of the allocation of resources to the control signals ACK/NACK and CQI according to the resource apportionment shown in FIG. 14A. FIG. 14A shows the relationship between the measured channel quality (CQI level) and the resources used for ACK/NACK and used for CQI. It is assumed that CQI in FIG. 14A has four levels (levels 1 to 4), and that the channel quality becomes better as the CQI level rises from 1 to 4. Note, however, that although four CQI levels are shown here as an example, the number of CQI levels is not limited to this. It is also possible to perform the resource allocation control, with as many CQI levels as necessary being set.

Referring to FIG. 14A, when resources are apportioned to ACK/NACK and CQI within a single TTI, the ratio of the resource (the number of bits) used for CQI is increased as the CQI level rises, thereby increasing the coding rate. For example, for ACK/NACK & CQI at a CQI level of 2, the ratio of the resource (the number of bits) used for ACK/NACK is 1 whereas the ratio of the resource (the number of bits) used for CQI is 4. However, for ACK/NACK & CQI at a CQI level of 4, the ratio of the resource used for ACK/NACK is 1 whereas the ratio of the resource used for CQI is 8. At this time, assuming that control signals of mobile stations are code-division-multiplexed, that QPSK is used as the modulation scheme, and that as for the format, twelve LBs are used for the control signals and two LBs are used for the reference signal, then the number of transmission bits (the number of bits output from the encoding section) is 24 per TTI. Accordingly, the encoding rates for ACK/NACK and CQI are as follows respectively: $(1+4)/24=0.208$, and $(1+8)/24=0.375$. Although shown here is an example where the number of bits for ACK/NACK is always one, the present invention is not limited to this. The present invention can also be similarly applied to the case where ACK/NACK is composed of a plurality of bits.

Incidentally, with respect to the multiplexing of the reference and control signals at LB level, resource allocation control can be performed as in the first exemplary embodiment described earlier. Additionally, if a table as shown in FIG. 14A is provided to each of the base station 100 and the mobile station 200 and a notification number is assigned beforehand to each control item (resource ratio associated with a CQI level and with a control signal type), then the base station 100 can perform similar resource allocation control only by notifying a mobile station of a notification number. This makes it possible to reduce the number of transmission bits for a downlink control signal.

By encoding as described above, multiple types of control signals can be multiplexed at bit level in each long block as shown in FIG. 14B, and the coding rates for these control signals can be changed depending on the channel quality. Accordingly, depending on the channel quality, optimum amounts of resources can be allocated respectively to a reference signal and multiple control signals having different required conditions, such as ACK/NACK and CQI, whereby the efficiency of resource usage can be enhanced. Moreover, in conjunction with this scheme, it is also possible to adopt the changing of the modulation scheme and the transmission power as described in the first and second exemplary embodiments.

5. Various Aspects

As described before, the first object of the present invention is to provide a resource allocation control method and device that can achieve the efficient allocation of control resources between multiple types of control signals.

In addition, another object of the present invention is to provide a method and an apparatus for resource allocation control that can accomplish the efficient apportionment of resources among a reference signal and multiple types of control signals.

According to the present invention, a method of controlling resource allocation in a resource block including control resources used for a plurality of types of control signals and reference resources used for reference signals, to radio communications between a plurality of radio stations, includes: measuring propagation channel quality between a first radio station and a second radio station at one or both of the first and second radio stations; determining resource apportionment of the plurality of types of control signals in the control resources based on the propagation channel quality; and notifying the other one of the first and second radio stations of the resource apportionment.

As described above, according to the present invention, depending on the channel quality, optimum amounts of resources can be allocated respectively to multiples types of control signals having different required conditions, or respectively to a reference signal and control signals, whereby the efficiency of resource usage can be enhanced. Even when not all the required conditions of the control signals are satisfied in particular, the efficient use of resources can be accomplished by controlling the resource ratio while considering the degree of importance of each control signal.

As an embodiment, the first radio station and the second radio station may be a base station and a mobile station of a mobile radio communications system, respectively. The first radio station may measure the propagation channel quality using the reference signal received from the second station and notify the second station of the resource apportionment which is determined based on the propagation channel quality.

Alternatively, the second radio station may measure the propagation channel quality using the reference signal received from the first station and notify the first station of the resource apportionment which is determined based on the propagation channel quality.

The resource apportionment of control and reference resources within the resource block may be determined based on the propagation channel quality. Preferably, the ratio of the control resources within the resource block is increased and the ratio of the reference resources is decreased as the propagation channel quality becomes better.

Further, the plurality of types of control signals may include channel quality information which indicates the propagation channel quality, wherein the ratio of resource allocated to the channel quality information within the control resources is increased as the propagation channel quality becomes better.

As an embodiment, at least one of modulation scheme, encoding rate and transmission power may be set for at least one of the plurality of types of control signals based on the propagation channel quality. As an example, at least one of controls of: increasing number of modulation levels; increasing an encoding rate; and decreasing transmission power, may be performed as the propagation channel quality becomes better.

The present invention can be applied to mobile radio systems in general in which resource allocation is performed.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A method of controlling resource allocation in a resource block including control resources used for a plurality of types of control signals and reference resources used for reference signals, to radio communications between a plurality of radio stations, comprising:
measuring propagation channel quality between a first radio station and a second radio station at one or both of the first and second radio stations;
determining resource apportionment among the plurality of types of control signals and reference signals based on the propagation channel quality; and
notifying the other one of the first and second radio stations of the resource apportionment;
determining resource apportionment among the plurality of types of control signals and reference signals by determining a ratio between the plurality of types of control signals and reference signals, wherein the plurality of types of control signals includes channel quality information, which indicates the propagation channel quality; and
increasing the ratio of resource allocated to the channel quality information within the control resources as the propagation channel quality becomes better.

2. The method according to claim 1, wherein the first radio station and the second radio station are a base station and a mobile station of a mobile radio communications system, respectively.

3. The method according to claim 2, wherein the first radio station measures the propagation channel quality using the reference signal received from the second radio station and notifies the second radio station of the resource apportionment which is determined based on the propagation channel quality.

4. The method according to claim 2, wherein the second radio station measures the propagation channel quality using the reference signal received from the first radio station and notifies the first radio station of the resource apportionment which is determined based on the propagation channel quality.

5. The method according to claim 1, wherein the ratio of the control resources within the resource block is increased and the ratio of the reference resources is decreased as the propagation channel quality becomes better.

6. The method according to claim 1, further comprising setting at least one of modulation scheme, encoding rate and transmission power for at least one of the plurality of types of control signals based on the propagation channel quality.

7. The method according to claim 6, wherein at least one of controls of: increasing number of modulation levels; increasing an encoding rate; and decreasing transmission power, is performed as the propagation channel quality becomes better.

8. A device for controlling resource allocation in a resource block including control resources used for a plurality of types of control signals and reference resources used for reference signals, to radio communications between a plurality of radio stations, comprising:
a measurement section configured to measure propagation channel quality between a first radio station and a second radio station at one or both of the first and second radio stations;
a resource apportionment setting section configured to determine resource apportionment among the plurality of types of control signals and reference signals based on the propagation channel quality; and
a communication section configured to notify the other one of the first and second radio stations of the resource apportionment;
wherein the resource apportionment setting section is configured to determine resource apportionment among the plurality of types of control signals and reference signals by determining a ratio between the plurality of types of control signals and reference signals;
wherein the plurality of types of control signals includes channel quality information, which indicates the propagation channel quality; and
wherein the resource apportionment setting section is further configured to increase the ratio of resource allocated to the channel quality information within the control resources as the propagation channel quality becomes better.

9. The device according to claim 8, wherein, as the propagation channel quality becomes better, the resource apportionment setting section is further configured to increase the ratio of the control resources within the resource block and decrease the ratio of the reference resources.

10. The device according to claim 8, wherein the resource apportionment setting section is further configured to set at least one of modulation scheme, encoding rate, and transmission power for at least one of the plurality of types of control signals based on the propagation channel quality.

11. The device according to claim 10, wherein the resource apportionment setting section is further configured to perform at least one of controls of: increasing number of modulation levels; increasing an encoding rate; and decreasing transmission power, as the propagation channel quality becomes better.

12. The device according to claim 8, wherein the first radio station and the second radio station are a base station and a mobile station of a mobile radio communications system, respectively, wherein the communication section of the first radio station notifies the second radio station of the resource apportionment.

13. The device according to claim 8, wherein the first radio station and the second radio station are a base station and a mobile station of a mobile radio communications system, respectively, wherein the communication section of the second radio station notifies the first radio station of the resource apportionment.

14. A base station which controls resource allocation in a resource block including control resources used for a plurality of types of control signals and reference resources used for reference signals, to radio communications with a plurality of mobile stations, comprising:
a measurement section configured to measure propagation channel quality between the base station and a mobile station using an uplink reference signal received from the mobile station;
a resource apportionment setting section configured to determine resource apportionment among the plurality of types of control signals and reference signals based on the propagation channel quality; and
a communication section configured to notify the mobile station of the resource apportionment;
wherein the resource apportionment setting section is configured to determine resource apportionment among the plurality of types of control signals and reference signals by determining a ratio between the plurality of types of control signals and reference signals;
wherein the plurality of types of control signals includes channel quality information, which indicates the propagation channel quality; and wherein the resource apportionment setting section is further configured to increase the ratio of resource allocated to the channel quality information within the control resources as the propagation channel quality becomes better.

15. A mobile station which controls resource allocation in a resource block including control resources used for a plurality of types of control signals and reference resources used for reference signals, to radio communications with a base station, comprising:
- a measurement section configured to measure propagation channel quality between the base station and the mobile station using a downlink reference signal received from the base station;
- a resource apportionment setting section configured to determine resource apportionment among the plurality of types of control signals and reference signals based on the propagation channel quality; and
- a communication section configured to notify the base station of the resource apportionment using a predetermined resource in the resource block;

wherein the resource apportionment setting section is configured to determine resource apportionment among the plurality of types of control signals and reference signals by determining a ratio between the plurality of types of control signals and reference signals;

wherein the plurality of types of control signals includes channel quality information, which indicates the propagation channel quality; and wherein the resource apportionment setting section is further configured to increase the ratio of resource allocated to the channel quality information within the control resources as the propagation channel quality becomes better.

16. A mobile communications system which controls resource allocation in a resource block including control resources used for a plurality of types of control signals and reference resources used for reference signals, comprising:
- a base station; and
- a mobile station;
- wherein at least one of the base station and the mobile station comprises:
  - a measurement section configured to measure propagation channel quality between the base station and the mobile station using a downlink reference signal received from the base station;
  - a resource apportionment setting section configured to determine resource apportionment among the plurality of types of control signals and reference signals based on the propagation channel quality; and
  - a communication section configured to notify the base station of the resource apportionment using a predetermined resource in the resource block;

wherein the resource apportionment setting section is configured to determine resource apportionment among the plurality of types of control signals and reference signals by determining a ratio between the plurality of types of control signals and reference signals;

wherein the plurality of types of control signals includes channel quality information, which indicates the propagation channel quality; and wherein the resource apportionment setting section is further configured to increase the ratio of resource allocated to the channel quality information within the control resources as the propagation channel quality becomes better.

17. A non-transitory computer readable medium that stores a program for controlling resource allocation in a resource block including control resources used for a plurality of types of control signals and reference resources used for reference signals, to radio communications between a plurality of radio stations, said program, when executed, causes operations comprising:
- measuring propagation channel quality between a first radio station and a second radio station at one or both of the first and second radio stations;
- determining resource apportionment among the plurality of types of control signals and reference signals based on the propagation channel quality; and notifying the other one of the first and second radio stations of the resource apportionment;

wherein the resource apportionment setting section is configured to determine resource apportionment among the plurality of types of control signals and reference signals by determining a ratio between the plurality of types of control signals and reference signals;

wherein the plurality of types of control signals includes channel quality information, which indicates the propagation channel quality; and wherein the resource apportionment setting section is further configured to increase the ratio of resource allocated to the channel quality information within the control resources as the propagation channel quality becomes better.

* * * * *

UNITED STATES PATENT AND TRADEMARK OFFICE
CERTIFICATE OF CORRECTION

| | | Page 1 of 1 |
|---|---|---|
| PATENT NO. | : 8,428,011 B2 | |
| APPLICATION NO. | : 12/073768 | |
| DATED | : April 23, 2013 | |
| INVENTOR(S) | : Inoue et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1142 days.

Signed and Sealed this
Twenty-first Day of January, 2014

Michelle K. Lee
*Deputy Director of the United States Patent and Trademark Office*